(12) United States Patent
Choi

(10) Patent No.: US 7,931,296 B2
(45) Date of Patent: Apr. 26, 2011

(54) VEHICLE STEERING SYSTEM INCLUDING IRROTATIONAL AIRBAG MODULE

(75) Inventor: Hyeongho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 217 days.

(21) Appl. No.: 12/255,822

(22) Filed: Oct. 22, 2008

(65) Prior Publication Data
US 2009/0152840 A1    Jun. 18, 2009

(30) Foreign Application Priority Data

Dec. 15, 2007 (KR) .................. 10-2007-0131812

(51) Int. Cl.
*B60R 21/203* (2006.01)
(52) U.S. Cl. ............... 280/731; 280/728.2; 280/779
(58) Field of Classification Search ............... 280/728.2, 280/731, 730.1, 779; 74/552, 492, 498
See application file for complete search history.

(56) References Cited

U.S. PATENT DOCUMENTS

| | | | | |
|---|---|---|---|---|
| 3,744,817 A * | 7/1973 | Ousset | .................. | 280/730.1 |
| 4,429,588 A * | 2/1984 | Emundts et al. | ............ | 74/484 R |
| 4,899,613 A * | 2/1990 | Kawaguchi | .................. | 74/552 |
| 5,152,358 A * | 10/1992 | Kozuka | .................. | 180/78 |
| 5,676,395 A * | 10/1997 | Oe et al. | .................. | 280/730.2 |
| 5,749,598 A * | 5/1998 | Exner et al. | ............... | 280/728.2 |
| 6,113,136 A * | 9/2000 | Hamada et al. | ............... | 280/731 |
| 6,739,213 B2 * | 5/2004 | Sonobe et al. | .................. | 74/552 |
| 6,892,605 B2 * | 5/2005 | Menjak | ............... | 74/552 |
| 7,380,828 B2 * | 6/2008 | Menjak et al. | .................. | 280/779 |
| 7,455,316 B2 * | 11/2008 | Andersson et al. | ............ | 280/731 |
| 2001/0033072 A1 * | 10/2001 | Kumagai et al. | ............ | 280/730.1 |
| 2002/0059848 A1 | 5/2002 | Adomeit | | |
| 2002/0121153 A1 * | 9/2002 | Hoblingre | ............ | 74/492 |
| 2003/0164060 A1 * | 9/2003 | Menjak | ............ | 74/552 |
| 2005/0062269 A1 * | 3/2005 | Amamori | .................. | 280/731 |
| 2006/0214409 A1 * | 9/2006 | Tamura et al. | .................. | 280/771 |

FOREIGN PATENT DOCUMENTS

| | | |
|---|---|---|
| EP | 1 342 639 A2 | 9/2003 |
| JP | 4-24480 A | 9/1992 |
| JP | 10-258698 A | 9/1998 |
| KR | 10-2005-0061005 A | 6/2005 |
| WO | WO 2005/100097 A1 | 10/2005 |

* cited by examiner

*Primary Examiner* — Faye M. Fleming
*Assistant Examiner* — Drew Brown
(74) *Attorney, Agent, or Firm* — Morgan, Lewis & Bockius LLP

(57) ABSTRACT

A steering system includes a steering column and a steering wheel gear that are offset from each other so that the torque of steering wheel is transmitted to steering column. An airbag module received in a steering wheel hub of steering wheel is independently mounted such that it is not rotated together with steering wheel by using an offset torque transmission structure interconnecting the steering wheel and steering column. Such configuration allows deployment of a cushion having an asymmetrical optimum shape configured to avoid contacting the chest of a passenger. As the airbag module is not rotated, it is possible to significantly improve the design visibility of a logo.

6 Claims, 4 Drawing Sheets

(a)

(c)

(b)

← - - - - - TRANSMISSION PATH

VEHICLE STEERING SYSTEM INCLUDING IRROTATIONAL AIRBAG MODULE

CROSS-REFERENCE TO RELATED APPLICATION

The present application is based on and claims priority from Korean Patent Application Number 10-2007-0131812 filed Dec. 15, 2007, the entire contents of which is incorporated herein for all purposes by this reference.

BACKGROUND OF THE INVENTION

1. Field of the Invention

The present invention relates to a vehicle steering system, and more particularly, to a vehicle steering system including an irrotational airbag module in which an airbag module is mounted independently of the rotation of a steering wheel.

2. Description of Related Art

In general, safety devices for a vehicle are classified into active safety devices (brake, antilock brake systems or ABS, traction control systems or TCS, and navigation systems) that prevent an accident from occurring, and passive safety devices (safety belts, airbags, and pretensioners) that protect a passenger when an accident occurs.

Among such safety devices, an airbag system is a device that inflates an airbag before a secondary collision of a passenger in order to protect a passenger during a collision. Airbag systems are generally provided adjacent a driver seat and/or a passenger seat in order to prevent a face of a driver and/or a passenger from being injured.

Among the airbag systems, an airbag module of a driver's seat is generally mounted on a hub of a steering wheel. Therefore, when a steering wheel is rotated, the airbag module is also rotated.

Since the airbag module is rotated together with the steering wheel as described above, a particular connecting member, a so called SRC clock spring that is used to connect a wire harness to a rotating part (e.g., steering wheel) is used in order to prevent power cables or signal lines, which are connected to an inflator, from interfering due to the rotation However, the airbag of a driver's seat, which is mounted on the steering wheel and generally rotates together with the steering wheel during steering, has various limitations. For example, an airbag cushion, which is deployed during the operation of the airbag, should be deployed so as to sufficiently protect a driver regardless of the position of the steering wheel. For this reason, the airbag cushion should always have a symmetrical shape, and the airbag of the driver's seat cannot have an asymmetrical optimum shape unlike the airbag of the passenger seat. Further, the lower portion of the deployed cushion strongly presses the chest of the passenger, so that the passenger may be injured.

In addition, since the logo formed on the airbag module of the driver's seat is rotated together with the steering wheel, the design visibility of the logo deteriorates. Further, a sensor, which is provided on a crash pad so as to detect that a driver dozes off at the wheel, may be covered depending on the rotation of the steering wheel. As a result, the performance of the sensor deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a vehicle steering system including an irrotational airbag module. According to the vehicle steering system, a steering wheel that transmits a steering force to a steering column, and an airbag module that is mounted on a hub of a steering wheel are independently connected without using a SRC clock spring so that the airbag module is not rotated regardless of the rotation of the steering wheel. Accordingly, the airbag cushion may be deployed regardless of the position of the steering wheel and may have an asymmetrical optimum shape, so that a chest of a passenger is not harmfully compressed. Therefore, it is possible to prevent undesired injury.

Further, various aspects of the present invention provide for a vehicle steering system including an irrotational airbag module that may significantly improve the design visibility of a logo formed on an airbag module of a driver's seat as the airbag module is not rotated regardless of the rotation of the steering wheel.

Furthermore, various aspects of the present invention provide for a vehicle steering system including an irrotational airbag module capable of improving the performance of a sensor for detecting when a driver dozes off at the wheel, regardless of the position of the steering wheel as the airbag module is not rotated regardless of the rotation of the steering wheel.

One aspect of the present invention is directed to a vehicle steering system including an irrotational airbag module, the vehicle steering system including a steering wheel that includes a steering wheel hub, a steering column including a pinion, which meshes with a rack bar for moving tie rods for steering vehicle wheels, and which is surrounded by a column housing and is supported by a bearing so that torque is transmitted from the steering wheel to an upper end of the steering column positioned adjacent the steering wheel, a torque transmission assembly connecting the steering wheel with the steering column by gears so that an axis of the steering wheel is offset from an axis of the steering column, and transmitting torque of the steering wheel to the steering column, a circuit connecting assembly in which a wire harness connected to an ACU (Airbag Control Unit) surrounds the column housing, is disposed in a space between the steering wheel and the steering column, and is connected to a central portion of a steering wheel hub of the steering wheel, and/or an airbag module including a mounting bracket and a cushion cover, the mounting bracket receiving a cushion deployed from the steering wheel due to the injection of gas of an inflator that receives a control signal from the ACU and operates to generate high-pressure gas, and being received in the steering wheel hub of the steering wheel, the cushion cover being inserted into the steering wheel hub, being configured to rupture during the deployment of the cushion, and being fitted to the mounting bracket so that the torque of the steering wheel is not transmitted to the cushion cover.

The torque transmission assembly may include a column gear that is connected to the end of the steering column, a steering wheel gear that forms an empty space therein and engages the column gear so that the steering column is offset, and/or a steering wheel connecting boss that integrally extends from the steering wheel gear, and is firmly fixed to the lower portion of the steering wheel so as to rotate the steering wheel gear.

A hooked connecting end may be formed on the mounting bracket, and may be fitted to a groove of the cushion cover.

The circuit connecting assembly may include a wire inlet tube that is positioned at an inner space of the steering wheel gear, and is integrally formed with the steering wheel connecting boss, wherein an end of the wire inlet tube protrudes from the column housing, a wire outlet tube that is connected to the wire inlet tube so as to be connected to the inflator through the steering wheel connecting boss, and a wire that is connected to the inflator from the wire inlet tube along the wire outlet tube.

A wire-direction changing tube may be formed on the wire inlet tube so as to guide the wire along the axis of the steering wheel.

The cushion of the airbag module, which is deployed toward a passenger, may have an asymmetrical structure that includes a recessed portion configured to avoid contact with a chest of the passenger.

The vehicle steering system may further include a sensor that is provided on the airbag module and detects that a driver dozes off at the wheel.

According to various aspects of the present invention, an airbag module may include asymmetrical optimum cushioning mounted independently of the rotation of the steering wheel without using a SRC clock spring. Therefore, it is possible to protect a passenger while the chest is not harmfully compressed by the airbag cushion deployed from the steering wheel. Further, since a logo formed on the airbag module is not rotated, it is possible to significantly improve the design visibility of the logo.

Further, since an airbag module according to various aspects of the present invention is not rotated regardless of the rotation of the steering wheel, the performance of a sensor for detecting when a driver dozes off at the wheel can be always maintained. As a result, it is possible to maintain the performance for safe driving optimum.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
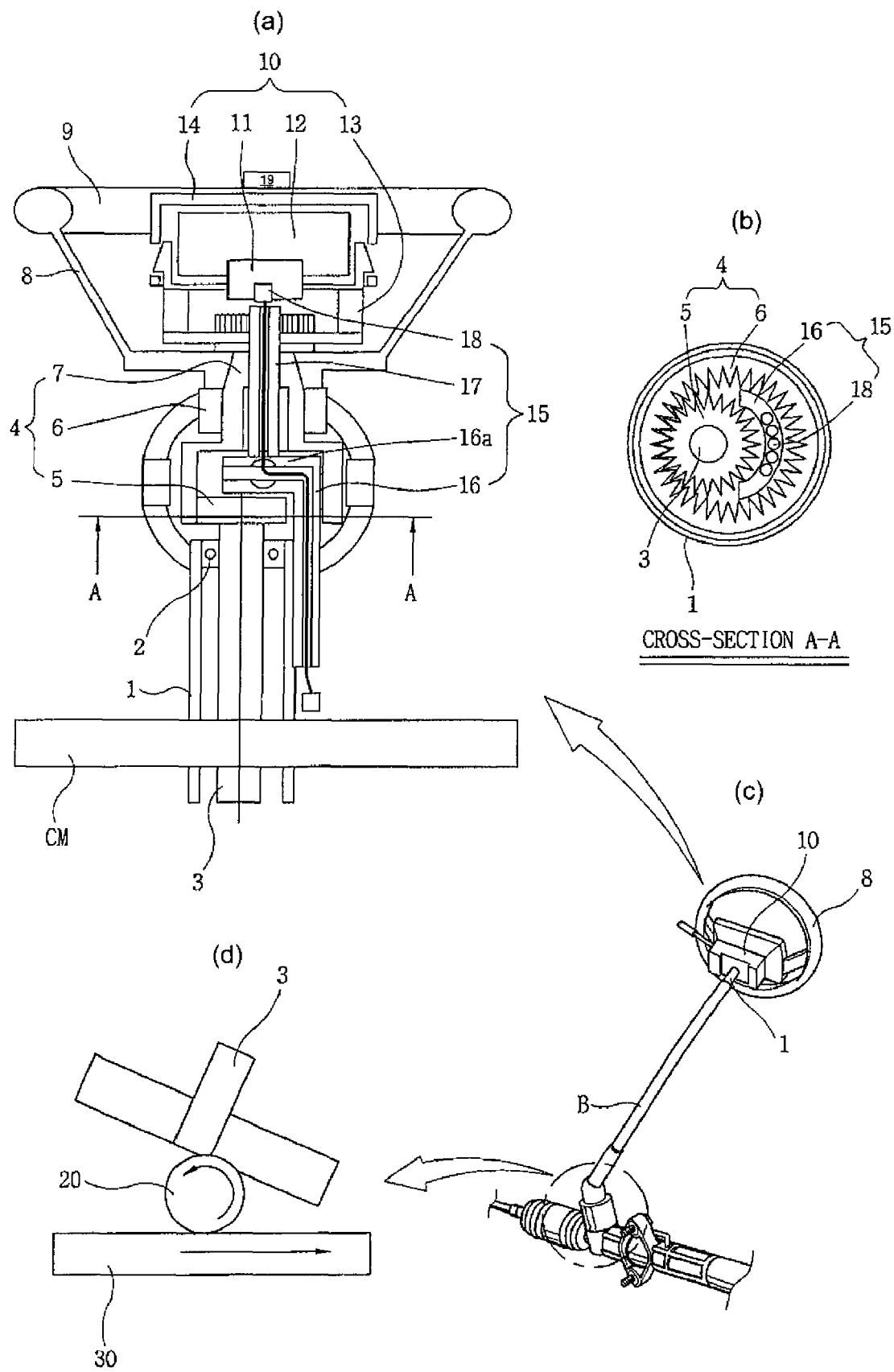
FIG. 1(a) is a view showing the structure of vehicle steering system including an irrotational airbag module according to various aspects of the present invention.
FIG. 1(b) is a view showing the structure of vehicle steering system including an irrotational airbag module according to various aspects of the present invention.
FIG. 1(c) is a view showing the structure of vehicle steering system including an irrotational airbag module according to various aspects of the present invention.
FIG. 1(d) is a view showing the structure of vehicle steering system including an irrotational airbag module according to various aspects of the present invention.

FIG. 1 is a view showing the structure of a vehicle steering system including an irrotational airbag module according to various aspects of the present invention. The steering system according to various exemplary embodiments of the present invention includes a steering column 3, a gearbox, and an airbag module 10. The steering column is connected with a steering wheel 8 by gears so that torque of the steering wheel is transmitted to the steering column. The gearbox includes a pinion 20 that is engaged with a rack bar 30 for moving tie rods connected to both wheels, and moves rack bar 30 by the rotation of steering column 3. The airbag module is connected to a wire harness connected to the steering wheel through a portion of steering column 3 that is connected to steering wheel 8, and is mounted on a steering wheel hub 9 of steering wheel 8 not to be affected by the rotation of steering wheel 8.

For this purpose, a torque transmission assembly 4 connects steering wheel 8 to steering column 3 by gears, and transmits torque. The torque transmission assembly includes a column gear 5, a steering wheel gear 6, and a steering wheel connecting boss 7. The column gear is connected to the end of steering column 3. Steering wheel gear 6 forms an empty space therein to inscribe column gear 5, that is, sufficiently engage column gear 5 while providing a through-space between steering wheel gear 6 and column gear 5, as shown in FIG. 1(b). The steering wheel connecting boss integrally extends from steering wheel gear 6, and is firmly fixed to the lower portion of steering wheel 8 so as to rotate steering wheel gear 6.

In this case, torque transmission assembly 4 makes an axis of steering column 3 be offset from an axis of steering wheel 8. The reason for this is to make steering wheel gear 6 be inscribed with column gear 5 of steering column 3 on one side, and to position the wire harness connected to airbag module 10 on the other side.

Further, column gear 5 is formed of a pinion, and formed at the end of steering column 3. Furthermore, steering wheel connecting boss 7 integrally formed with steering wheel gear 6 is covered with a column housing 1 that surrounds steering column 3 and is connected to steering wheel 8.

In addition, the end of steering column 3 and steering wheel connecting boss 7 are supported by bearings 2 that are fitted to column housing 1.

Further, when a steering force of steering wheel 8 is transmitted to rack bar 30 via steering column 3 and pinion 20, the gearbox achieves the movement of the wheel corresponding to the operation of steering wheel 8 by adjusting a diameter of pinion 20 that is rotated by steering column 3 having the number of rotations different from that of steering wheel 8, that is, having a gear ratio of about 1:1.3.

Further, airbag module 10 includes an inflator 11, a cushion 12, a mounting bracket 13, and a cushion cover 14. The inflator receives a control signal from an ACU (Airbag Control Unit), and operates to generate high-pressure gas. The cushion is deployed from steering wheel 8 due to the injection of gas of inflator 11. The mounting bracket receives cushion 12 connected to inflator 11, and is received in steering wheel hub 9 of steering wheel 8. The cushion cover is inserted into steering wheel hub 9, is broken during the deployment of cushion 12, and is fitted to mounting bracket 13 so that the torque of steering wheel 8 is not transmitted to the cushion cover.

In this case, a hooked connecting end is formed on mounting bracket 13, and is fitted to a groove of cushion cover 14. Therefore, even though steering wheel hub 9 is rotated together with steering wheel 8, only cushion cover 14 is rotated together with steering wheel hub 9.

Figure 2:
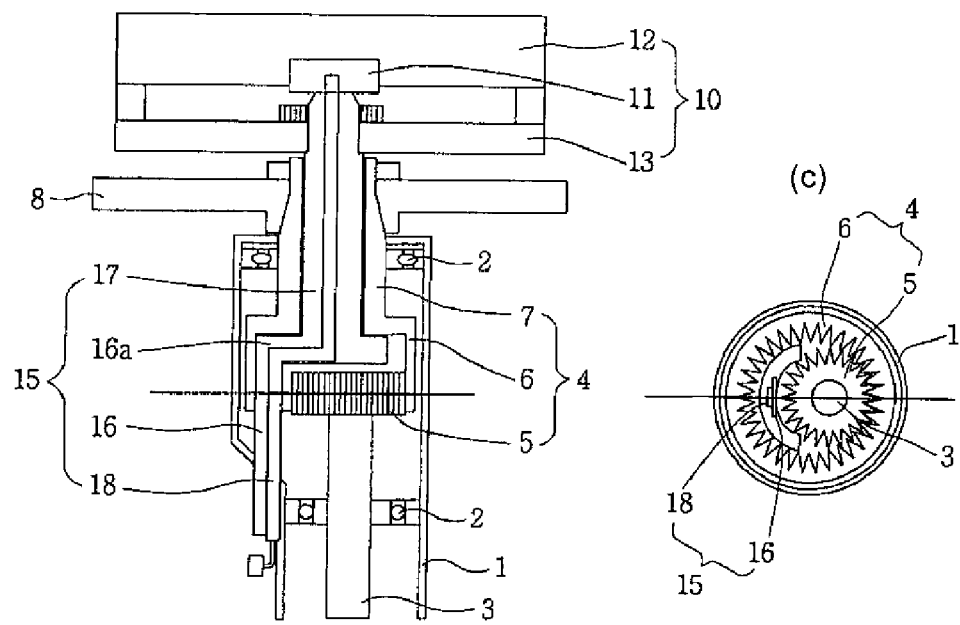
FIG. 2(a) is a view showing the structure of a steering column including an irrotational airbag module according to various aspects of the present invention.
FIG. 2(b) is a view showing the structure of a steering column including an irrotational airbag module according to various aspects of the present invention.
FIG. 2(c) is a view showing the structure of a steering column including an irrotational airbag module according to various aspects of the present invention.
Figure 2:
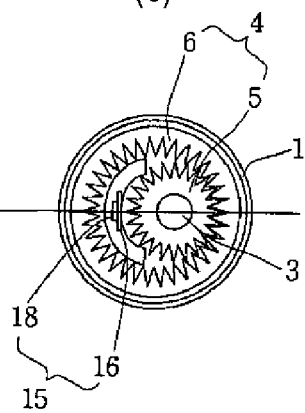
Figure 2:
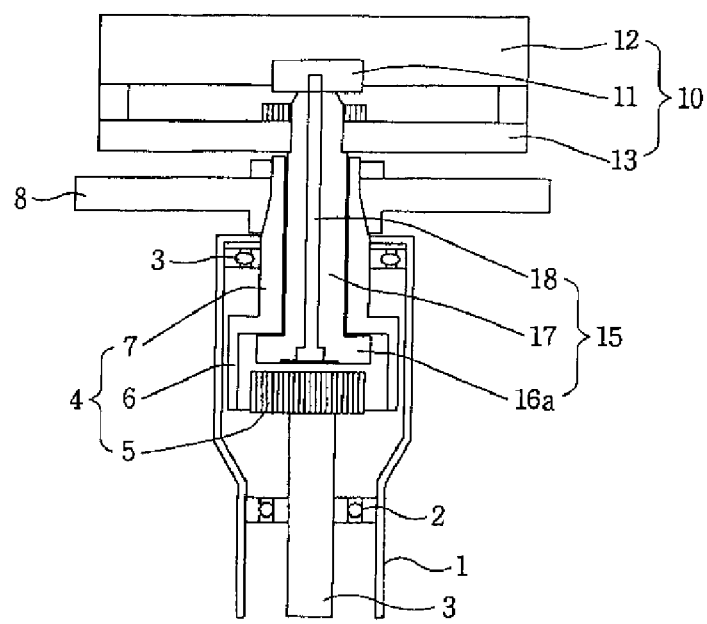

In addition, airbag module 10 is connected to the wire harness, which is used to supply an ACU control signal and electric power, by using a circuit connecting assembly 15. Further, as shown in FIGS. 2(*a*), 2(*b*) and 2(*c*), circuit connecting assembly 15 includes a wire inlet tube 16, a wire outlet tube 17, and a wire 18. An end of the wire inlet tube protrudes from column housing 1, and the wire inlet tube is positioned at an inner space of steering wheel gear 6 integrally formed with steering wheel connecting boss 7. The wire outlet tube is connected to wire inlet tube 16 so as to be connected to inflator 11 through steering wheel connecting boss 7. The wire is connected to inflator 11 from wire inlet tube 16 along wire outlet tube 17.

In this case, wire outlet tube 17 passes trough steering wheel connecting boss 7 not to be affected by the rotation of the steering wheel connecting boss.

In addition, a wire-direction changing tube 16*a* is formed on wire inlet tube 16, and is connected to wire outlet tube 17. Wire-direction changing tube 16*a* guides wire 18 on the axis of steering wheel 8.

That is, wire-direction changing tube 16*a* extends toward one side so as to compensate the offset of wire inlet tube 16, which is inserted into one side space, that is, an empty space of steering wheel gear 6 integrally formed with steering wheel connecting boss 7, and wire outlet tube 17 extends at the center thereof.

In addition, a sensor 19 for detecting that a driver dozes off at the wheel is provided on airbag module 10. Since airbag module 10 is not affected by the rotation of steering wheel 8, the performance of the sensor is further improved as compared to when the sensor is mounted on the steering column cover or a crash pad.

The operation of the vehicle steering system according to the various exemplary embodiments of the present invention will be described in detail below with reference to accompanying drawings.

In the steering system according to the various aspects of the present invention, while being offset from each other, steering wheel 8 and steering column 3 are connected by gears so that the torque of steering wheel 8 is transmitted to steering column 3. Further, airbag module 10 received in steering wheel hub 9 of steering wheel 8 is independently mounted not to be rotated together with steering wheel 8 by using an offset torque transmission structure of steering wheel 8 and steering column 3. Therefore, when being deployed, cushion 12 has an asymmetrical shape that maybe optimized to avoid contact with the chest of a passenger or to reduce pressing contact to minimize force and reduce injury to the chest of a passenger. Further, since airbag module 10 is not rotated, it is possible to improve the design visibility of a logo.

The steering system according to various aspects of the present invention transmits the torque of steering wheel 8 to steering column 3 while the steering wheel and the steering column are offset from each other. That is, as shown in FIGS. 1(*a*) to 1(*d*), the steering system has the following structure. That is, steering column 3 including pinion 20 that meshes with rack bar 30 for moving the tie rods is disposed to be offset from steering wheel 8, column gear 5 meshes with the end of offset steering column 3 by steering wheel gear 6 fixed to steering wheel 8, and the control signal of the ACU is transmitted to airbag module 10 mounted on steering wheel 8 through the wire harness provided in an empty space of steering wheel gear 6.

Figure 3:
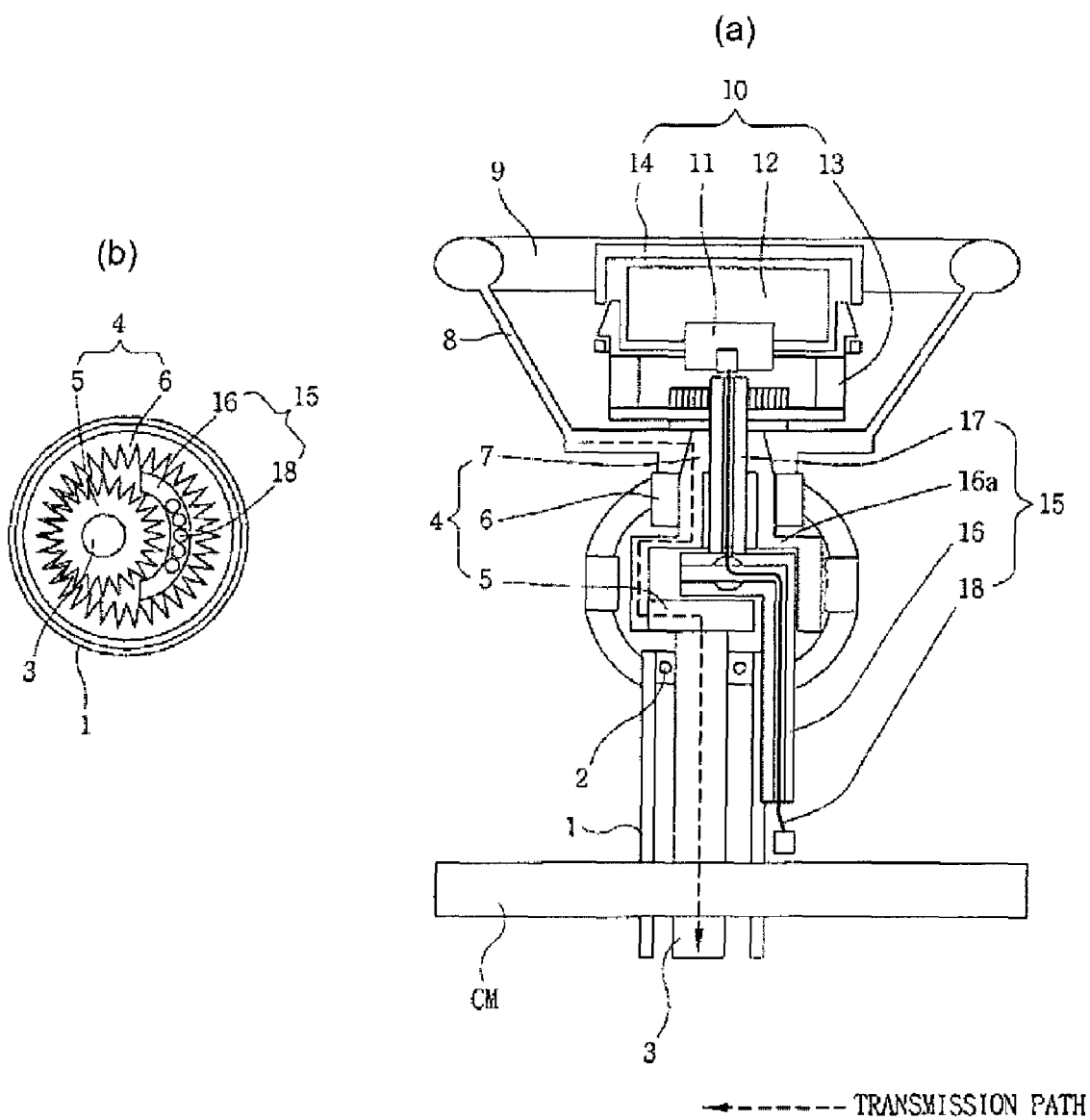
FIG. 3(a) is a view illustrating an operation of the vehicle steering system including an irrotational airbag module according to various aspects of the present invention.
FIG. 3(b) is a view illustrating an operation of the vehicle steering system including an irrotational airbag module according to various aspects of the present invention.

Accordingly, when a driver rotates steering wheel 8, the torque applied to steering wheel 8 is transmitted to steering wheel gear 6 via steering wheel connecting boss 7 as shown in FIGS. 3(*a*) and 3(*b*) and the rotation of steering wheel gear 6 makes inscribed column gear 5 rotate in the same direction as the steering wheel.

In this case, column gear 5 is received in column housing 1 that passes through cowl cross member CM and is supported, and is disposed at the end of steering column 3 connected to the gearbox. Accordingly, while being inscribed with steering wheel gear 6, the column gear is rotated.

The rotation of column gear 5 makes steering column 3 rotate and makes pinion 20 provided at the end of the steering column rotate. While being moved due to the rotation of pinion 20, rack bar 30 moves the tie rods connected to both wheels. Due to the movement of rack bar 30, the wheels are steered with a steering force corresponding to steering wheel 8.

In this case, if the diameter of pinion 20, which generates torque to be finally output at the end of steering column 3, is adjusted at the time of designing the pinion, it is possible to adjust the difference between the number of rotations of steering wheel gear 6 that is rotated by steering wheel 8, and the number of rotations of column gear 5 that transmits torque to steering column 3.

When the steering operation is performed through the rotation of steering wheel 8 as described above, airbag module 10 mounted on steering wheel hub 9 of steering wheel 8 is not rotated regardless of the rotation of steering wheel 8. This is due to the structure of mounting bracket 13 connected to cushion cover 14 that is mounted on steering wheel hub 9, receives cushion 12 connected to inflator 11, and is broken during the deployment of cushion 12.

That is, since mounting bracket 13 and cushion cover 14 are fitted to each other by the hook and the groove, the torque of steering wheel 8 is transmitted only through steering wheel connecting boss 7 fixed to steering wheel 8.

For this reason, in column housing 1, wire inlet tube 16 disposed in an inner empty space of steering wheel gear 6 where column gear 5 of steering column 3 is inscribed is connected to wire outlet tube 17 connected to inflator 11 by wire-direction changing tube 16*a* that compensates the offset between wire inlet tube 16 and steering wheel 8, regardless of the rotation of steering wheel 8.

Therefore, wire 18, which is connected to the ACU and connected to inflator 11 through wire inlet tube 16, wire-direction changing tube 16*a*, and wire outlet tube 17, is also rotated regardless of the rotation of steering wheel 8 and transmits a control signal from the ACU to inflator 11 during the deployment of the airbag.

Figure 4:
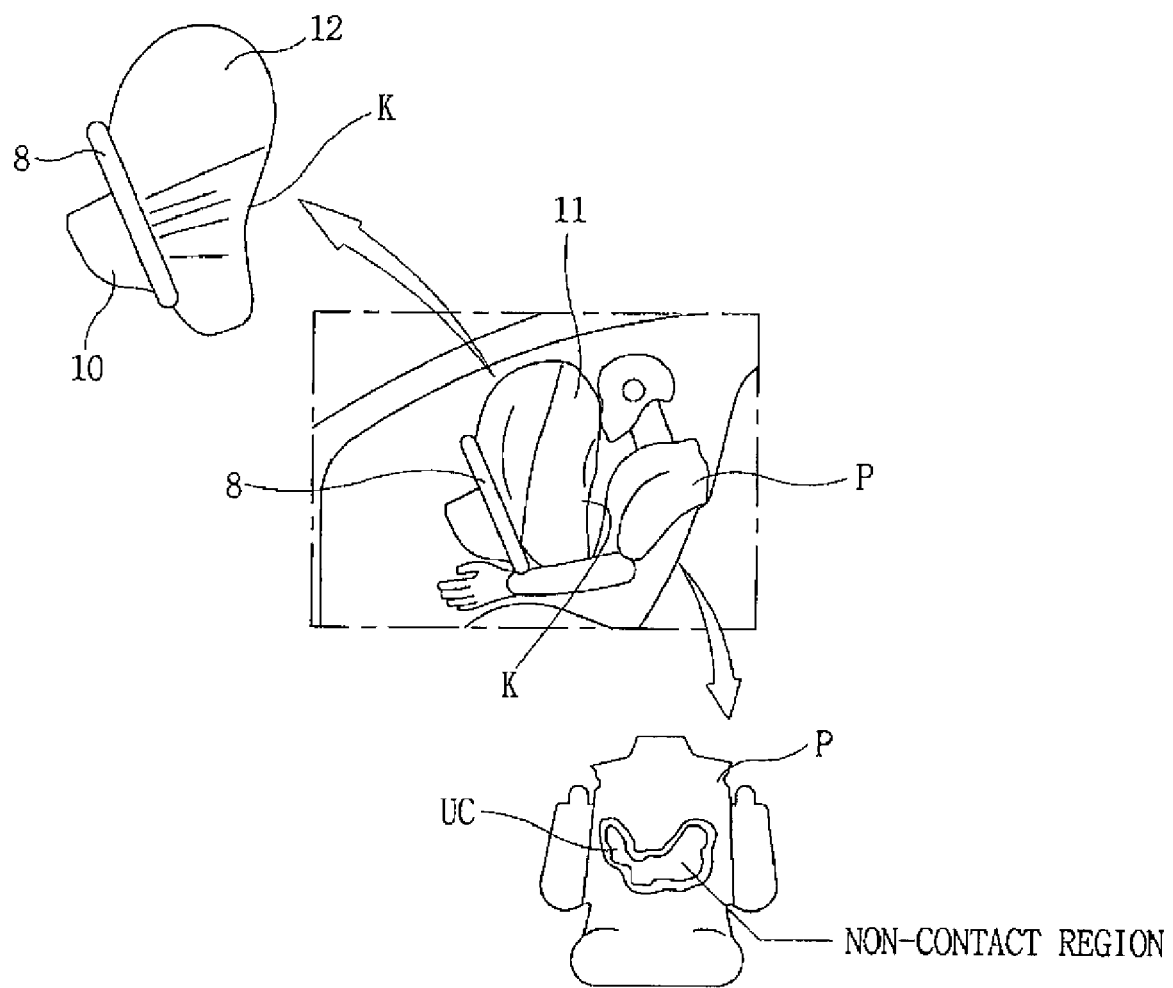
FIG. 4 is a view showing that an irrotational airbag according to various aspects of the present invention is operated.

Airbag module 10, which is not rotated regardless of the rotation of steering wheel 8 as described above, does not press the chest of a passenger P during the operation thereof. As shown in FIG. 4, cushion 12 deployed toward passenger P is always disposed at an optimum position. Therefore, when cushion 12 is deployed, cushion 12 has a recess forming portion K not to press, that is, configured to avoid contact with the chest of passenger P. Even though being deployed toward passenger P, recess forming portion K forms a non-contact region UC that does not contact with the chest of passenger P.

For convenience in explanation and accurate definition in the appended claims, the terms "upper", "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle steering system including an irrotational airbag module, the vehicle steering system comprising:
    a steering wheel that includes a steering wheel hub;
    a steering column including a pinion, which meshes with a rack bar for moving tie rods for steering vehicle wheels, and which is surrounded by a column housing and is supported by a bearing so that torque is transmitted from the steering wheel to an upper end of the steering column positioned adjacent the steering wheel;
    a torque transmission assembly connecting the steering wheel with the steering column by gears so that an axis of the steering wheel is offset from an axis of the steering column, and transmitting torque of the steering wheel to the steering column;
    a circuit connecting assembly in which a wire harness connected to an ACU (Airbag Control Unit) surrounds partially the column housing, is disposed in a space between the steering wheel and the steering column, and is connected to a central portion of a steering wheel hub of the steering wheel; and
    an airbag module including a mounting bracket and a cushion cover, the mounting bracket receiving a cushion deployed from the steering wheel due to the injection of gas of an inflator that receives a control signal from the ACU and operates to generate high-pressure gas, and being received in the steering wheel hub of the steering wheel, the cushion cover being inserted into the steering wheel hub, being configured to rupture during the deployment of the cushion, and being fitted to the mounting bracket so that the torque of the steering wheel is not transmitted to the cushion cover;
    wherein the circuit connecting assembly includes:
        a wire inlet tube that is positioned under a steering wheel gear, wherein an end of the wire inlet tube protrudes from the column housing;
        a wire outlet tube that is connected to the wire inlet tube so as to be connected to the inflator through a steering wheel connecting boss, wherein the steering wheel gear is connected to the steering wheel connecting boss; and
        a wire that is connected to the inflator from the wire inlet tube along the wire outlet tube.

2. The vehicle steering system as defined in claim 1, wherein the torque transmission assembly includes:
    a column gear that is connected to the end of the steering column;
    a steering wheel gear that forms an empty space therein and engages the column gear so that the steering column is offset; and
    a steering wheel connecting boss that integrally extends from the steering wheel gear, and is firmly fixed to the lower portion of the steering wheel so as to rotate the steering wheel gear.

3. The vehicle steering system as defined in claim 1, wherein a hooked connecting end is formed on the mounting bracket, and is fitted to a groove of the cushion cover.

4. The vehicle steering system as defined in claim 1, wherein a wire-direction changing tube is formed on the wire inlet tube so as to guide the wire along the axis of the steering wheel.

5. The vehicle steering system as defined in claim 1, wherein the cushion of the airbag module, which is deployed toward a passenger, has an asymmetrical structure that includes a recessed portion configured to avoid contact with a chest of the passenger.

6. The vehicle steering system as defined in claim 1, further comprising:
    a sensor that is provided on the airbag module and detects that a driver dozes off at the wheel.

* * * * *